Figure 1:
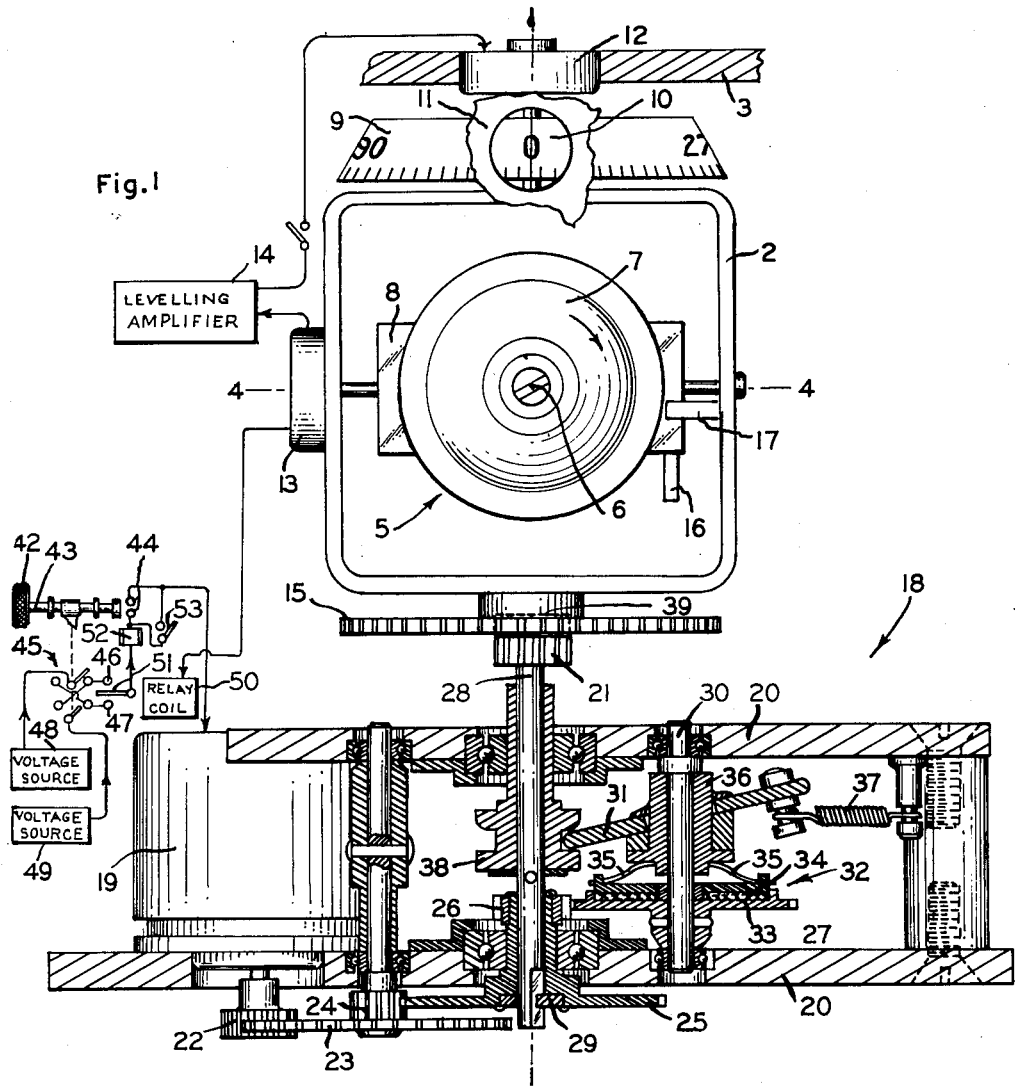

March 6, 1956     H. G. SWANSON     2,737,053
GYRO SETTING DEVICE

Filed Nov. 26, 1954     2 Sheets-Sheet 1

Inventor:
Harry G. Swanson
by, Richard E. Hosley
His Attorney

March 6, 1956  H. G. SWANSON  2,737,053
GYRO SETTING DEVICE

Filed Nov. 26, 1954  2 Sheets-Sheet 2

Inventor:
Harry G. Swanson
by, Richard E. Hosley
His Attorney

500
United States Patent Office 2,737,053
Patented Mar. 6, 1956

2,737,053
GYRO SETTING DEVICE

Harry G. Swanson, Lynn, Mass., assignor to General Electric Company, a corporation of New York Application November 26, 1954, Serial No. 471,352

7 Claims. (Cl. 74—5.4)

The present invention relates to gyroscopes, and, more particularly, to gyroscopic apparatus provided with improved high-torque setting devices.

In accordance with teachings of the copending application of Harry C. Wendt for "Gyro Setting Apparatus," Serial No. 465,523, filed October 29, 1954, assigned to the same assignee as that of the present application, gyroscopes which are stopped about their minor axes of suspension may be set with desired orientations about both their minor and major axes in response to torques impressed only about their major axes. To enable the sufficiently rapid precessions which must occur to realize such gyro setting, the torques applied sequentially in first one and then the other angular direction about a major gyro axis must be exceptionally high, and yet the frictions, inertias, and dormant locking torques of the high-torque major axis torque-applying means must be minimized to prevent undue interference with operation of the gyroscope under normal conditions of use. If a high-torque large-size motor of the type having its rotor permanently fixed with the major axis gyro shaft is employed, the inertia and weight of the motor rotor is added to these same characteristics of the main gyro gimbal, and the locking torques between the unexcited motor rotor and stator are added about the major gyro axis, whereby the gyroscope errors are magnified intolerably. Accordingly, the torque-applying apparatus which is taught by this application is wholly disengaged and de-coupled from the gyroscope at times when no setting is to be accomplished, and becomes coupled with the gyroscope in a torque-exerting relationship only during setting intervals.

The requirements of major-axis torque-applying means for the setting of a gyroscope about both its major and minor axes are unique in that torques must initially be impressed about the major gyro axis in one angular direction and must then be reversed in direction. In addition, the torques delivered are difficult to realize in that they are accompanied by angular motion during certain portions of the setting interval, and not during others. My arrangements advantageously utilize conventional types of reversible motors in combination with simple gearing, slip-clutching, and camming elements to effect positive and rapid setting in full satisfaction of the aforesaid requirements.

One object of the present invention is to provide precision gyroscope apparatus having novel and improved major axis torque motor means which exerts torques in two directions and which may be wholly de-coupled from influencing relationships with the gyroscope.

Another object is to provide simple and improved gyro setting apparatus for applying high torques about the major axes of sensitive low-drift gyroscopes.

By way of a summary account of one aspect of this invention, a directional gyroscope embodiment of gyroscopic apparatus is equipped with mechanical stops which limit relative angular movement of its rotor structure and main gimbal about its normally horizontal minor gyro axis. These stops are positioned such that they will ordinarily engage only when the gyroscope assumes abnormal attitudes, in a well known manner. Further, the gyroscope is equipped with a minor axis electrical pick-off, a levelling amplifier excited by the pick-off output signals, and with my major axis torque-applying means to which the levelling amplifier delivers power output signals. As is disclosed in the aforementioned copending application, the gyroscope may be set in azimuth and to a levelled condition in response to actuation of switching devices, which devices first connect the electric motor of my torque-applying means with a suitable power source. Upon being excited, the electric motor rotates in one direction, turning a pinion which is adapted to engage with a gear fixed with the main gimbal but which is normally out of engagement with that main gimbal gear. Simultaneously, a clutch and camming arrangement is actuated by the motor, urging the pinion into mesh with the gimbal gear such that torque is applied in one direction about the major gyro axis. This torque occasions precession of the gyro rotor structure about the minor axis until the minor axis stops are struck. Once the stops engage, gyroscopic rigidity about the major gyro axis is lost, and the pinion drives the gimbal gear and main gimbal freely about the major axis, clutch slippage in the clutch arrangement of the torque-applying means being permitted to occur at such times such that the pinion will remain enmeshed with the main gimbal gear. The observer waits momentarily until the gyro azimuth card or dial reaches the desired heading, and then disconnects the power source from the electric motor of the torque-applying arrangement by means of the switching apparatus, at the same time coupling the output of the levelling amplifier to the electric motor. Because the gyro rotor structure is tilted away from the level condition at that instant, the minor axis pick-off will excite the levelling amplifier in a sense which results in reversed excitation being applied to the electric motor. The withdrawal of motor excitation and subsequent application of reversed excitation first causes the torque pinion to be disengaged from the gimbal gear and then to be re-engaged and to exert torque in the opposite direction. This reversed torque precesses the gyro rotor structure away from the stop-engaged position and toward the levelled condition, until the levelled condition is realized and the minor axis pick-off delivers no output signals. The electric motor is thus left unenergized, and the torque pinion is automatically retracted from engagement with the main gimbal gear, by suppressed spring torque earlier built up during the torque-applying interval. Thereupon the gyro is freed from all influences of the torque-applying means until the next setting sequences are initiated.

Figure 2:
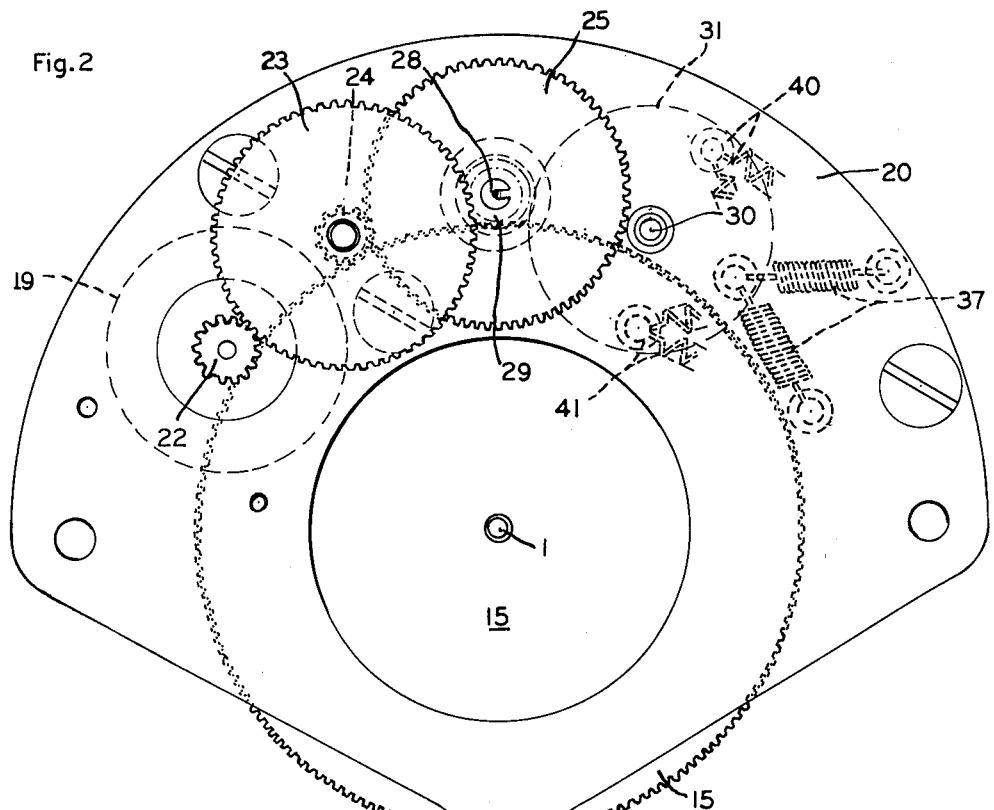
Figure 3:
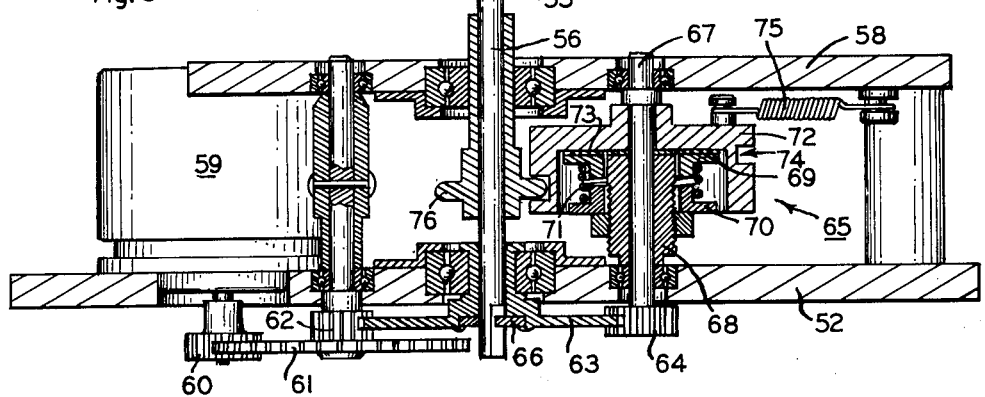

Although the features of this invention which are believed to be novel are set forth in the appended claims, the details of preferred embodiments and further objects and advantages may be most readily comprehended through reference to the following description taken in connection with the accompanying drawings, wherein:

Figure 1 illustrates a directional gyroscope in association with torque-applying means constructed in conformity with teachings of this invention, the torque-applying apparatus being shown partly sectioned;

Figure 2 views the apparatus of Figure 1 from the underside thereof;

Figure 3 is a partly-sectioned side view of an alternative embodiment of gyro torque-applying apparatus; and Figure 4 pictures a cam and clutching element for a gyro torque motor arrangement, with portions cut away to display internal components.

In the gyroscopic apparatus reproduced in Figure 1 there is included a directional gyroscope of the well known three-axis type. The normally vertical major gyro axis 1—1 is that about which the main gimbal 2 is pivotally supported in the outer frame 3; the normally horizontal minor axis 4—4 is that about which the gyro rotor structure 5 is pivoted in the main gimbal 2; and the spin axis 6 is that about which the gyro rotor member 7 revolves at high speed to develop required gyroscopic inertias. In the particular gyroscope embodiment illustrated, the rotor structure 5 is of the twin symmetrical construction wherein another substantially hemispherical rotor half such as rotor half 7 is disposed on the other side of the flat support plate 8 which passes between these rotor halves and is pivoted in main gimbal 2, rotor structures of this nature being disclosed in the copending application of Harry C. Wendt for "Symmetrical Gyroscope," Serial No. 325,577, filed December 12, 1952, assigned to the same assignee as that of the present application. An azimuth card 9 is affixed to main gimbal 2, providing an indication of the compass heading when viewed through window 10 of the outer housing 11 of the entire assembly. For the purpose of applying relatively low torques about the major axis 1—1 to accomplish normal levelling precession of rotor structure 5 about the minor axis 4—4, there is provided an electromagnetic torque motor 12. Levelling errors or tilts of the rotor structure 5 about minor axis 4—4 are detected by the minor axis pick-off 13 which, like torque motor 12, may be of a conventional type. When the pick-off signals are applied to a suitable levelling amplifier 14 and the amplifier output signals excite the major axis torque motor 12, then the gyro rotor structure 5 will be automatically maintained in a predetermined levelled relationship to main gimbal 2, in the usual manner. A main gimbal gear 15 fixed with the gimbal 2 about major axis 1—1 is associated with the gyroscope to enable high setting torques to be applied through it about the major axis. Further, gimbal stops are provided to limit relative angular movements permissible between the rotor structure 5 and the main gimbal 2. Such stops are illustrated in the form of a pin 16 projecting from the rotor structure plate 8 and a pair of stop pins 17 fixed with the gimbal 2, only one of the pair of pins 17 being visible in the view of Figure 1. Preferably, these stops limit relative angular freedom of the rotor structure and main gimbal to between 160 and 180 degrees, such that gimbal lock conditions are just avoided. High-angle stops of this type not only preclude the occurrence of gimbal lock but also insure that ambiguities in the azimuth orientations of the main gimbal will be avoided, despite violent maneuvering of the instrument, as is taught in the copending application of Allen T. Sinks for "Gyroscope," Serial No. 594,628, filed May 19, 1945, assigned to the same assignee as that of the present application.

To the directional gyroscope assembly described thus far there is added a major-axis torque-applying means 18 which is capable of exerting sizable torques about the major axis 1—1 and which may be selectively coupled with and uncoupled from the gimbal gear 15 for this purpose. The reversible electric motor component 19 of the torque-applying means is mounted in the supports 20 fixed with the outer instrument frame 3, and functions to apply torque to the pinion 21 which is normally held in the illustrated position out of engagement with main gimbal gear 15. Pinion 21 remains out of engagement with gimbal gear 15 as long as electric motor 19 is unenergized, whereby the frictions, inertias and locking torques of the torque-applying mechanism 18 do not interfere with normal operation of the precision gyroscope assembly. Upon excitation of motor 19 its rotor pinion 22 acts to turn the train of gears 23, 24, 25, 26 and 27. Gear 25 rotates the torque pinion 21, through their common shaft 28, a key 29 being provided to lock shaft 28 and gear 25 together angularly while permitting the shaft 28 and its torque pinion 21 to move axially for the purpose of engaging and disengaging torque pinion 21 and the gyro gimbal gear 15.

Enmeshed gears 26 and 27 serve to turn the shaft 30 and its relatively rotatable cam or oblique wobble plate 31 through a friction clutching mechanism 32 which affords a desired slipping action. One of the clutch faces, 33, may be a surface of the gear 27 itself, while the other clutch element, 34, is spring-loaded and coupled with the cam 31 through resilient members 35. Oblique cam member 31 is angularly movable in relation to its supporting shaft 30 by virtue of its mounting on a sleeve-bearing element 36, although the angular travel of cam 31 is restrained by return springs such as spring 37 which urge the cam to the illustrated orientation. Cam member 31 rides in the annular grooved cam member 38 which is affixed to the torque pinion shaft 28 such that rotation of oblique cam 31 will raise and lower cam member 38 and thereby cause its attached pinion 21 to become engaged with and disengaged from gimbal gear 15. Figure 2 is a view of the apparatus taken from the under side, which provides further details of the placements of the above-enumerated components.

It will be perceived that when motor 19 is energized, it will cause torque pinion 21 to revolve, and, at the same time, the clutch 32 will rotate the oblique cam member 31 about half a turn such that the clutch member 38 will move upwardly and force pinion 21 into meshed engagement with the gimbal gear 15. Dashed lines 39 in Figure 1 characterize this engaged position of the torque pinion. Once the pinion 21 and gimbal gear 15 are locked together in this manner, pinion 21 applies torque about the major gyro axis 1—1, although no movement of gimbal gear 15 takes place immediately and, instead, motor 19 tends to stall. In response to this torque about axis 1—1, the gyro rotor structure 5 is precessed about minor axis 4—4 until stops 16 and 17 engage to destroy gyroscopic rigidity of main gimbal 2, whereupon motor 19 is no longer stalled and turns gear 15 and gimbal 2 in azimuth about axis 1—1. The further rotation of gears 26 and 27 during the interval when pinion 21 is turning gimbal gear 15 does not cause cams 31 and 38 to retract pinion 21 because cam springs 37 prevent cam 31 from turning more than 180 degrees and because slippage then occurs between the faces of clutch 32. Dashed lines 40 and 41 in Figure 2 indicate the angular limits of clutch and spring travel which are permitted in a typical installation. Withdrawal of excitation from motor 19 results in return of cam 31 to the position depicted in Figure 1, by action of the return springs 37. This return movement urges cam member 38 and torque pinion 21 to their lowered positions, whereby gimbal gear 15 is fully decoupled from the torque-applying means 18.

It is one of the steps in the setting of the gyroscope about both support axes that torque next be applied in the opposite angular direction about the major axis 1—1. This may be accomplished by applying reversed-polarity electrical excitation to the reversible motor 19. Thereupon, the earlier-described action which results in engagement of pinion 21 and gimbal gear 15 will be repeated, with the motor, gears and other parts moving in the reversed angular directions. The reversed torque is applied only until rotor structure 5 has precessed away from the stop-engaged position to a predetermined levelling orientation relative to gimbal 2 about minor axis 4—4, whereupon the excitation of motor 19 is interrupted until a subsequent full setting operation is to be performed. Interruption of excitation of motor 19 of course results in retraction of torque pinion 21, such that the gyroscope operation is unimpeded by the torque apparatus 18.

Arrangements for energizing motor 19 to accomplish full setting of the gyroscope are the subject of the aforementioned copending application of H. C. Wendt, and, in the interest of providing here a fuller understanding of the manner in which my apparatus may be operated, one suitable energizing arrangement has been set forth in Figure 1. Setting and levelling operations are initiated by pressing knob 42 inwardly. The resulting movement of knob shaft 43 closes contacts 44 and, through double-throw reversing switch 45, couples relay contacts 46 and 47 with the oppositely-phased voltage sources 48 and 49, respectively. Minor axis pick-off 13 will deliver output signals to the polarized relay coil 50, which will actuate the relay armature 51 into switching connection with one or the other of contacts 46 and 47, whereby current from one or the other of sources 48 and 49 will flow to motor 19 through holding relay coil 52 and closed contacts 44. Holding relay coil 52 then closes its contacts 53 to preserve current flow to the motor 19 irrespective of the possible opening of contacts 44. Motor 19 operates to precess rotor structure 5 to a stop-engaged position and thereafter freely rotates main gimbal 2 about the major axis 1—1. As soon as the correct azimuth heading is realized, knob 42 is pulled out, such that switch 45 thereafter applies voltage from a different one of sources 48 and 49 to motor 19. Gyroscopic rigidity is restored by the rotor structure precession away from the stop-engaged position which results from the reversed major axis torque occasioned by reversal of the phasing of voltage applied to motor 19. Azimuth heading is preserved while the rotor structure 5 continues to precess to a level position. Once the levelled condition occurs, relay coil 50 senses no output from pick-off 13, whereupon relay armature 51 drops out to a non-contacting position, holding relay contacts 53 open, and torque motor 19 is de-energized. The gyroscope is then fully set and levelled, it having been necessary only to press in knob 42 until the desired azimuth heading appeared on the indicator 9, and to pull it out again at that time.

A second embodiment, which includes somewhat different clutching and camming mechanisms, is portrayed in Figure 3. There, a directional gyro gimbal gear 54 is meshed with a torque pinion 55 whenever the pinion shaft 56 elevates the pinion to the dashed-line position 57. Pinion shaft 56 is mounted for both rotation and movement about its longitudinal axis in the frame 58, which frame also supports the reversible electric motor 59, the train of gears 60, 61, 62, 63, and 64, and the clutch and cam mechanism 65. Gear 63, like the corresponding part in Figure 1, is keyed to its associated pinion shaft 56 by a key member 66, such that the pinion shaft will turn with it but will also be free to move axially. Power flow from motor 59 is traced through gears 60, 61, 62 and 63, which latter gear rotates pinion shaft 56, and through gear 64, which rotates shaft 67 of the clutch and cam mechanism 65. On shaft 67 there is mounted a threaded bushing 68, a clutch plate 69, an adjusting plate 70, a clutch biasing spring 71, and a combined cam and clutch member 72 which has an inner clutch face 73 and a continuous peripheral helical groove 74. The clutch and cam member 72 is sleeve-mounted on shaft 67 for relative angular movement when clutch slippage occurs, with restraint being imposed by return springs 75, and an adjusting nut is provided to occasion proper clutch biasing by clutch spring 71. Figure 4 provides a pictorial view of these cam and clutching features, portions of the mechanism 65 being cut away to expose the interior components. Disk-shaped cam follower 76 rides in cam groove 74 to accomplish the required elevation and lowering of pinion shaft 56 to which it is affixed.

When electric motor 59 is energized to rotate in one of its angular directions, the pinion shaft 56 initially rotates, as does the shaft 67. Through clutching members 69 and 72, the peripheral cam surfaces on member 72 are caused to turn, raising the disk cam 76 and its pinion shaft 56 until torque pinion 55 meshes with the gyro gimbal gear 54. Springs 75 are stretched during this operation and prevent cam member 72 from turning more than about 180 degrees, whereby the engagement between gears 55 and 54 is retained as long as the excitation of motor 59 is continued. Upon initial engagement of gears 54 and 55 in the setting operations detailed hereinbefore, angular movements cease while torque is impressed upon gimbal gear 54, the motor 59 being stalled at such times. Clutch slippage between clutch members 72 and 69 may occur whenever necessary. Interruption of motor excitation is followed by return of the various elements to the illustrated positions under influence of the return springs 75.

It should be apparent that various features of the apparatus shown and described may be modified in certain respects. Thus, for example, the combined slippage clutch and camming mechanisms may be made of two independent units, one a slippage clutch and the other a cam unit. Further, while return springs coupled with the cam mechanisms have been utilized in the illustrated embodiments for the purposes of limiting angular movements of the cam mechanisms and returning the torque pinion to retracted positions, these objectives may be reached or aided by using mechanical stops to limit the angular movements and by using different springs to urge the torque pinions to retracted positions in which they do not engage with the gyro gimbal gears. In addition, the torque pinion and gimbal gear arrangements may be replaced by friction elements such as a friction wheel in the torque-applying assembly and a friction drum on the main gyro gimbal in place of the gimbal gear.

While particular embodiments of this invention have been shown and described herein, it will occur to those skilled in the art that various changes, modifications and substitutions may be effected without departure either in spirit or scope from the invention as set forth in the appended claims.

What I claim as new and desire to secure by Letters Patent of the United States is:

1. An arrangement for exerting torques about the major axis of a gyroscope, comprising: an electric motor, torque-applying means movable from a position out of engagement with said gyroscope to a position of torque-applying engagement with said gyroscope about said major axis, means coupling said torque-applying means with said motor to receive torque from said motor, means resiliently urging said torque-applying means to said position out of engagement with said gyroscope, cam means rotatable to urge said torque-applying means into torque-applying engagement with said gyroscope against the force of said resilient means, clutch means coupling said cam means with said motor to receive torque from said motor, said clutch means being biased to slip when said torque-applying means opposes the force of said resilient means to a predetermined extent, and means for electrically exciting said motor to cause setting of said gyroscope.

2. In combination with a gyroscope of the three-axis type mounted on an instrument frame, the torque-applying arrangement mounted on said frame independently of said gyroscope for setting said gyroscope, comprising: an electric motor, a torque-applying member movable into and out of an engagement with said gyroscope wherein said member applies torque about the major axis of said gyroscope, means coupling said torque-applying member with said motor to apply torques from said motor to said gyroscope about said major axis, resilient means urging said torque-applying member out of engagement with said gyroscope, actuating means for moving said torque-applying member into engagement with said gyroscope against the force of said resilient means, clutch means coupling said actuating means with said motor for movement of said torque-applying means into said engagement when said motor is energized, said clutch means being biased to slip such that said motor may turn after said engagement is effected, and means for exciting said electric motor to cause setting of said gyroscope.

3. In combination with a gyroscope of the three-axis type mounted on an instrument frame and having a circular gimbal member fixed with the main gimbal of said gyroscope about its major axis, the torque-applying arrangement mounted on said frame independently of said gyroscope for setting said gyroscope, comprising: an electric motor, a shaft rotated by said motor, a torque-applying member rotatable with said shaft and adapted to engage said gimbal member to apply torques about said major axis, said torque-applying member being movable between positions wherein said torque-applying member is in and out of engagement with said gimbal member, resilient means urging said torque-applying member out of engagement with said gimbal member, means operated by said motor for urging said torque-applying means into engagement with said gimbal member when said motor is energized, said motor-operated means including a clutch coupling biased to slip when said members are engaged and said gimbal member is free to turn, and means for electrically exciting said motor to cause setting of said gyroscope.

4. In combination with a gyroscope of the three-axis type mounted on an instrument frame and having a circular gimbal member fixed with the main gimbal of said gyroscope about its major axis, the torque-applying arrangement mounted on said frame independently of said gyroscope for setting said gyroscope, comprising: an electric motor, a shaft rotated by said motor, a torque-applying member fixed with said shaft and adapted to apply torques to said gimbal member about said major axis when engaged with said gimbal member, said shaft being axially slidable between positions wherein said torque-applying member is in and out of engagement with said gimbal member, a slip clutch rotated by said motor, means operated by said motor through said slip clutch for moving said shaft axially to the position wherein said torque-applying member is in engagement with said gimbal member, means resiliently urging said shaft axially to move said torque-applying means out of engagement with said gimbal member, and means for electrically exciting said motor to cause setting of said gyroscope.

5. In combination with a gyroscope of the three-axis type mounted on an instrument frame and having a circular gimbal member fixed with the main gimbal of said gyroscope about its major axis, the torque-applying arrangement mounted on said frame independently of said gyroscope for setting said gyroscope, comprising: an electric motor, a shaft rotated by said motor, a torque-applying member fixed with said shaft and adapted to apply torques to said gimbal member about said major axis when engaged with said gimbal member, said shaft being axially slidable between positions wherein said torque-applying member is in and out of engagement with said gimbal member, a slip clutch rotated by said motor, a first cam member rotated by said motor through said slip clutch, a second cam member axially fixed with said shaft, said cam members cooperating such that rotation of said first cam member moves said second cam and shaft axially and engages said torque-applying means with said gimbal member, means resiliently urging said shaft axially to the position in which said torque-applying means is out of engagement with said gimbal member, and means for electrically exciting said motor to cause setting of said gyroscope.

6. In combination with a gyroscope of the three-axis type mounted on an instrument frame and having a circular gimbal member fixed with the main gimbal of said gyroscope about its major axis, the torque-applying arrangement mounted on said frame independently of said gyroscope for setting said gyroscope, comprising: a reversible electric motor, an axially-slidable shaft rotated by said motor, a torque-applying member fixed with said shaft and adapted to apply torques to said gimbal member about said major axis when said shaft is axially positioned to cause engagement of said members, a slip clutch rotated by said motor and adapted to slip when a predetermined angular retraint is imposed upon said clutch, a first cam member rotated by said motor through said slip clutch, a second cam member axially fixed with said shaft, said cam members cooperating to move said shaft axially to cause engagement of said torque-applying member and gimbal member, resilient means restraining movement of said second cam means and urging said shaft axially to cause disengagement of said torque-applying member from said gimbal member, and means for selectably exciting said reversible motor to turn in one and the opposite angular direction to cause setting of said gyroscope.

7. In combination with a gyroscope of the three-axis type mounted on an instrument frame and having a circular gimbal gear fixed with the main gyro gimbal about its major axis, the torque-applying arrangement mounted on said frame independently of said gyroscope for setting said gyroscope, comprising: a reversible electric motor, an axially-slidable shaft rotated by said motor, a pinion fixed with said shaft and adapted to apply torques to said gear about said major axis when said shaft is axially positioned to cause engagement of said pinion and gear, a clutch rotated by said motor and arranged to slip when a predetermined angular restraint is imposed upon said clutch, a first cam member rotated by said motor through said clutch, a second cam member axially fixed with said shaft, rotation of said first cam member through a predetermined angle causing axial movement of said second cam member and shaft which engages said pinion and cam, resilient means restraining angular movement of said first cam member to said predetermined angle and urging said shaft axially to disengage said pinion and gear, and means for selectably exciting said reversible motor to turn in one and then the opposite angular direction to cause setting of said gyroscope.

References Cited in the file of this patent

UNITED STATES PATENTS

| | | |
|---|---|---|
| 2,383,663 | MacCallum et al. | Aug. 28, 1945 |
| 2,429,605 | Brannin | Oct. 28, 1947 |
| 2,524,553 | Wendt | Oct. 3, 1950 |